(12) United States Patent
Hurst et al.

(10) Patent No.: US 10,995,860 B2
(45) Date of Patent: May 4, 2021

(54) AXIAL FACE SEAL ASSEMBLY WITH OUTWARDLY-BIASED BACKING RINGS

(71) Applicant: Aktiebolaget SKF, Gothenburg (SE)

(72) Inventors: Daniel Paul Hurst, West Jordan, UT (US); Tadd McBride, Riverton, UT (US); Tyler James Ryther, West Valley, UT (US); Wolfgang Swete, Knittelfeld (AT)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 16/424,579

(22) Filed: May 29, 2019

(65) Prior Publication Data

US 2019/0368614 A1 Dec. 5, 2019

Related U.S. Application Data

(60) Provisional application No. 62/678,719, filed on May 31, 2018.

(51) Int. Cl.
*F16J 15/34* (2006.01)
(52) U.S. Cl.
CPC ................... *F16J 15/3456* (2013.01)
(58) Field of Classification Search
CPC .. F16J 15/3456; E21B 33/128; E21B 33/1208
See application file for complete search history.

(56) References Cited

U.S. PATENT DOCUMENTS

| 1,277,975 | A | | 9/1918 | Mann |
| 2,733,969 | A | | 2/1956 | Polk |
| 2,927,830 | A | | 3/1960 | Workman |
| 2,953,398 | A | | 9/1960 | Haugen et al. |
| 3,572,735 | A | | 3/1971 | Dryer |
| 3,869,132 | A | | 3/1975 | Taylor et al. |
| 3,940,155 | A | | 2/1976 | Baumle |
| 4,062,550 | A | * | 12/1977 | Satsumabayashi ............ B62D 55/0887 277/380 |
| 4,179,130 | A | * | 12/1979 | Fass .................. F16J 15/3456 277/371 |
| 4,756,784 | A | | 7/1988 | Jones et al. |
| 6,273,231 | B1 | | 8/2001 | Koschmieder et al. |

(Continued)

*Primary Examiner* — Gilbert Y Lee
(74) *Attorney, Agent, or Firm* — J-TEK Law PLLC; Scott T. Wakeman; Mark A. Ussai (57) ABSTRACT

A seal assembly for sealing between first and second tubular members includes an annular seal body disposeable within an annular gland between the tubular members and formed of a generally compressible polymeric material. The seal body has a first axial sealing surface disposed against a first tubular member end surface, a second axial sealing member disposeable against a second tubular member end surface and a recess(es) defined partially by an angled activation surface. An annular backing ring formed of a substantially rigid material is disposed the body recess to couple the backing ring with the seal body. The backing ring has an outer axial end disposeable against the first member end surface to prevent radially outward displacement of the portions of the seal at the first member end surface and is biased axially toward the first member end surface when compression of the seal body displaces the activation surface axially.

10 Claims, 12 Drawing Sheets

(56) References Cited

U.S. PATENT DOCUMENTS

| | | |
|---|---|---|
| 6,814,358 B2 | 11/2004 | Keck |
| 7,207,606 B2 | 4/2007 | Owen et al. |
| 7,774,915 B2 | 8/2010 | Darce et al. |
| 3,393,400 A1 | 3/2013 | Buckle |
| 8,839,874 B2 * | 9/2014 | Bishop ............... E21B 33/1216 166/387 |
| 9,120,261 B2 | 9/2015 | Hench et al. |
| 9,194,519 B2 | 11/2015 | Holmes, IV et al. |
| 10,001,216 B2 | 6/2018 | Pucci et al. |
| 10,107,434 B1 | 10/2018 | Copeland |
| 10,302,200 B2 | 5/2019 | Dietle |
| 2001/0024016 A1 | 9/2001 | Gobeli et al. |
| 2002/0106923 A1 | 8/2002 | Copeland et al. |
| 2005/0062235 A1 | 3/2005 | Keene et al. |
| 2007/0071938 A1 | 3/2007 | Kawazoe |
| 2012/0023721 A1 | 2/2012 | Glachet |
| 2014/0203516 A1 | 7/2014 | Kocurek et al. |
| 2015/0115547 A1 | 4/2015 | Rushton et al. |
| 2015/0285381 A1 | 10/2015 | Preston et al. |
| 2019/0032783 A1 | 1/2019 | Yanagi et al. |

\* cited by examiner

AXIAL FACE SEAL ASSEMBLY WITH OUTWARDLY-BIASED BACKING RINGS

CROSS-REFERENCE TO RELATED APPLICATIONS

The present application claims the benefit of U.S. Provisional Patent Application No. 62/678,719 filed on May 31, 2018, the entire contents of which are hereby incorporated by reference.

BACKGROUND OF THE INVENTION

The present invention relates to seal assemblies, and more particularly to axial face seals used in abrasive environments.

Axial face seals are known and typically include an annular seal body formed of an elastomeric material. The seal body has at least one radial-extending surface on an axial end which sealingly engages an annular surface or "face" of a component, such as a drill pipe. Particularly when used in a highly abrasive environment, such in as a fracking pipe-line swivel joint, the combination of relative rotation of one pipe and the abrasive materials in the fracking fluid often cause degradation of the seal body material and possible failure of the seal.

SUMMARY OF THE INVENTION

In one aspect, the present invention is a seal assembly for sealing between first and second tubular members, each tubular member having a central passage and a generally annular end surface surrounding the passage, the first member passage being fluidly coupled with the second member passage, the first member end surface facing and being spaced apart from the second member end surface along a central axis so as to define an annular gland, and the first member being angularly displaceable about the axis with respect to the second member. The seal assembly comprises a generally annular seal body disposeable within the annular gland and formed of a generally compressible polymeric material, the seal body having opposing inner and outer radial ends, a first axial end having a first axial sealing surface disposeable against the first member end surface, a second axial end having a second axial sealing surface disposeable against the second member end surface. At least one recess is defined by a generally radial surface extending radially inwardly from the seal body outer radial end, an outer circumferential surface extending axially inwardly from the first axial end and an angled activation surface extending generally axially and radially between the radial surface and the circumferential surface, the first sealing surface being located generally between the recess and the inner radial end. Further, a generally annular backing ring is formed of a substantially rigid material and is disposed at least partially within the at least one seal recess to couple the backing ring with the seal body. The backing ring has opposing inner and outer radial ends and inner and outer axial ends, the outer axial end being disposeable against the first member end surface such that the backing ring prevents radially outward displacement of the portions of the seal at the first member end surface. The backing ring is biased generally axially toward the first member end surface when compression of the seal body displaces the activation surface generally axially.

In another aspect, the present invention is again a seal assembly as described in the preceding paragraph with the additional features that the at least one annular recess of the seal body has an annular socket extending radially inwardly from the outer circumferential surface of the recess, or the body further has an annular projection extending generally radially outwardly from the outer circumferential surface of the recess, and the backing ring either includes an annular projection extending generally radially inwardly from ring inner radial end and disposeable within the seal socket, or an annular socket extending generally radially outwardly from the ring inner radial end and the body projection is disposed within the backing ring socket, in either case to releasably couple the backing ring with the seal body.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-12 an axial face seal assembly 10 for sealing a joint J between first and second tubular members 12, 14, respectively, which collectively form a mechanical assembly 11. The mechanical assembly 11 is preferably a swivel joint of a pipe assembly for transporting fluids such as fracking fluid but may be any other assembly of mechanical parts or components utilizing an axial face seal. The first, inner tubular member 12 has a central passage 16 and a generally annular end surface 18 surrounding the passage 16 and the second, outer tubular member 14 has a central passage 20 and a generally annular end surface 22 surrounding the passage 20. The first member end surface 18 faces and is spaced apart along a central axis $A_C$ from the second member end surface 22, so as to define a generally annular space or seal "gland" $G_S$, and at least the second tubular member 14 is angularly displaceable about the axis $A_C$ with respect to the first tubular member 12. Preferably, the second tubular member 14 further has a collar portion 26 extending axially outwardly from and surrounding the end surface 22, which provides an inner circumferential surface 28 which encloses the radially outer end of the annular gland $G_S$. The seal assembly 10 is disposeable within the gland $G_S$ and basically comprises a generally annular seal body 30 formed of a generally compressible polymeric material and at least one backing ring 40, as preferred and shown in FIGS. 1-6, or alternatively two backing rings 40, a first ring 42A and a second ring 42B, as depicted in FIGS. 7-12. In either construction, each backing ring 40 is formed of generally rigid material and is coupled with the seal body 30.

The generally annular seal body 30 is preferably formed of hydrogenated nitrile butadiene rubber (HNBR) or polyurethane plastic but may be formed of any other similar known sealing material. The seal body 30 has opposing inner and outer radial ends 30a, 30b, respectively, an inner circumferential surface 31A on the inner end 30a and an outer circumferential surface 31B on the outer end 30b. The body 30 also has a first axial end 30c with a first axial sealing surface 32A disposeable against the first member end surface 18 and a second axial end 30d with a second axial sealing surface 32B disposeable against the second member end surface 22. Thereby, the sealing surfaces 32A, 32B substantially prevent fluid flow from the central passages 16, 20 through the gland $G_S$, and thus externally of the joint J between the tubular members 12, 14. Further, the seal body 30 also includes at least one recess 34, preferably a single recess 34 as shown in FIGS. 1-6, but may alternatively include two recesses 34 as depicted in FIGS. 7-12, each recess 34 being configured to receive a single backing ring 40.

Specifically, in the preferred construction shown in FIGS. 1-6, the seal body 30 has a single recess 34 configured to receive one backing ring 40 and defined by a generally radial surface 36 extending radially inwardly from the seal body outer radial end 30b, an outer circumferential surface 37 extending axially inwardly from the second axial end 30d and an angled activation surface 38 extending generally axially and radially between the radial surface 36 and the circumferential surface 37. With this structure, the first axial sealing surface 32A is located generally between the recess 34 and the inner radial end 30a, the second axial sealing surface 32B is located generally between the outer circumferential surface 31B and the inner radial end 30a, and the outer circumferential surface 31B is offset towards the second axial end 30d and extends axially between the radial surface 36 and the second axial sealing surface 32B. With the single recess 34, the seal body 30 has generally "L-shaped" axial cross-sections.

In the alternative construction shown in FIGS. 7-12, the seal body 30 may be formed having a first recess 35A configured to receive the first backing ring 42A and defined by a first generally radial surface 36A extending radially inwardly from the seal body outer radial end 30b, a first outer circumferential surface 37A extending axially inwardly from the first axial end 30c and a first angled activation surface 38A extending generally axially and radially between the radial surface 36A and the circumferential surface 37A. A second recess 35B is configured to receive the second backing ring 42B and is defined by a generally a second radial surface 36B extending radially inwardly from the seal body outer radial end 30b, a second outer circumferential surface 37B extending axially inwardly from the second axial end 30d and a second angled activation surface 38B extending generally axially and radially between the radial surface 36B and the circumferential surface 37B. With the structure of the two recesses 35A, 35B, the first axial sealing surface 32A is located generally between the first recess 35A and the inner radial end 30a, the second axial sealing surface 32B is located generally between the second recess 35B and the inner radial end 30a, and the outer circumferential surface 31B is centrally located and extends axially between the first and second radial surfaces 36A, 36B. By having the two recesses 34, the alternative construction seal body 30 is generally "T-shaped" and includes a radially extended central portion 31 and two axial shoulder portions 33A, 33B each extending axially outwardly from the central portion 31 in opposing axial directions.

Referring to FIGS. 2-5 and 8-11, each generally annular backing ring 40 is preferably formed of a substantially rigid material, preferably a metallic material such as aluminum bronze, bronze, aluminum, steel, etc., but may alternatively be formed of a rigid thermoplastic material, another rigid polymeric material, a ceramic, or any other appropriate material. Each of the one or two backing rings 40 is disposed at least partially within a separate recess 34 to couple the ring 40 with the seal body 30. Further, each backing ring 40 has opposing inner and outer radial ends 40a, 40b, inner and outer axial ends 40c, 40d each having a radial surface 41, an inner circumferential surface 43A on the inner radial end 40a and an outer circumferential surface 43B on the outer radial end 40b. Preferably, each backing ring 40 further has an angled engagement surface 44 extending axially and radially between the inner radial surface 41 and the inner circumferential surface 43A. Each ring engagement surface 44 is disposed generally against the seal body activation surface 38 of the associated seal body recess 34 or 35A, 35B, such that the activation surface(s) 38 act against the engagement surface(s) 44 during biasing of the rings 40, as described in detail below.

Referring to FIGS. 2, 3, 7 and 8, when the seal assembly 10 is installed within the gland $G_S$, each ring outer axial end 40d is disposed against the adjacent member end surface 18 or 22, such that the backing ring(s) 40 prevent radially-outward displacement or "extrusion" of the portions of the seal body 30 at the member end surface 18 or 22. More specifically, in the preferred construction, the backing ring 40 is biased axially toward the end surface 18 of the first, inner member 12 when compression of the seal body 30 displaces the seal body activation surface 38 generally axially and outwardly, to thereby enhance the anti-extrusion capability of the backing ring 40. That is, radially-outward compression of the seal body 30 displaces the backing ring 40 axially generally away from the second, outer member end surface 22 and generally toward and against the adjacent first, inner member end surface 18. Similarly in the alternative construction, each of the two backing rings 42A, 42B is biased generally axially toward the associated member end surface 18, 22, respectively, when compression of the seal body 30 displaces the seal body activation surfaces 38 generally axially and outwardly, such that each backing ring 42A, 42B is biased away from the other backing ring 42B, 42A and generally against the associated tubular member end surface 18, 22, respectively.

Figure 3:
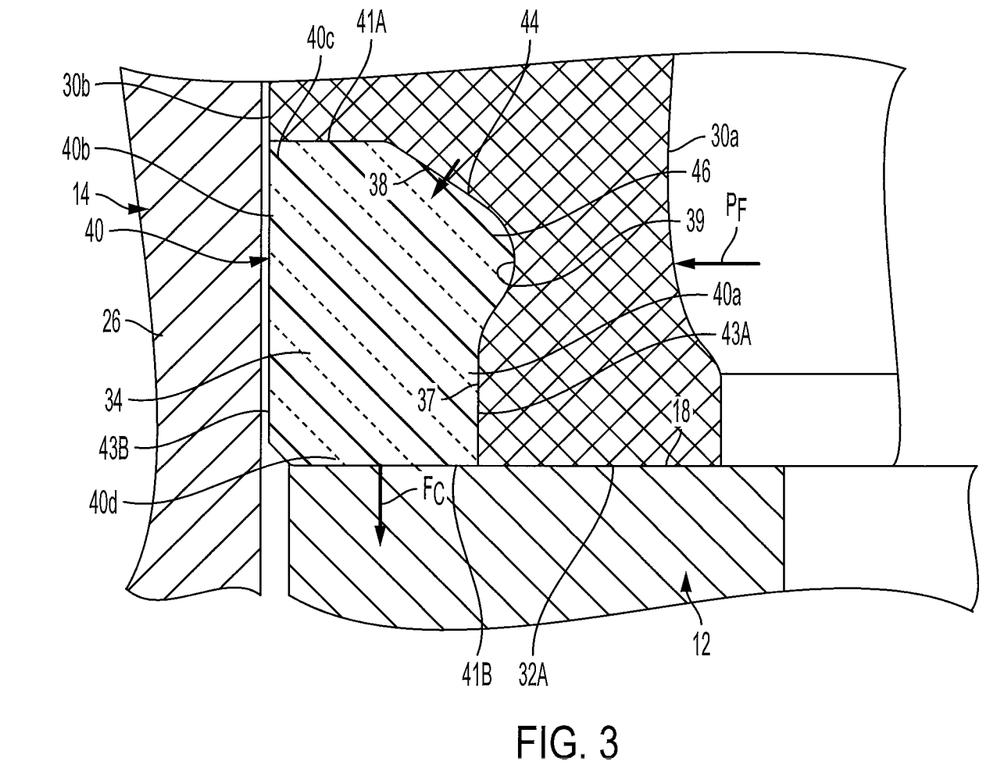
FIG. 3 is a more enlarged view of a portion of FIG. 2.
Figure 4:
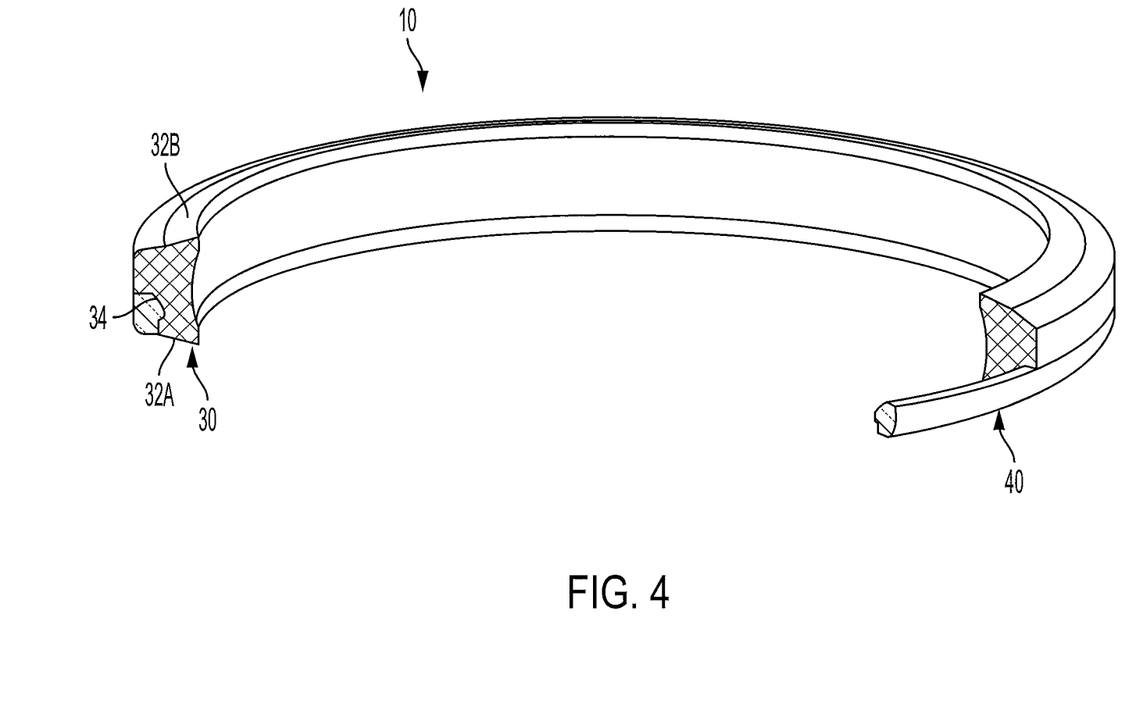
FIG. 4 is a broken-away, perspective view of the seal assembly, shown in a "free" or uninstalled state.
Figure 9:
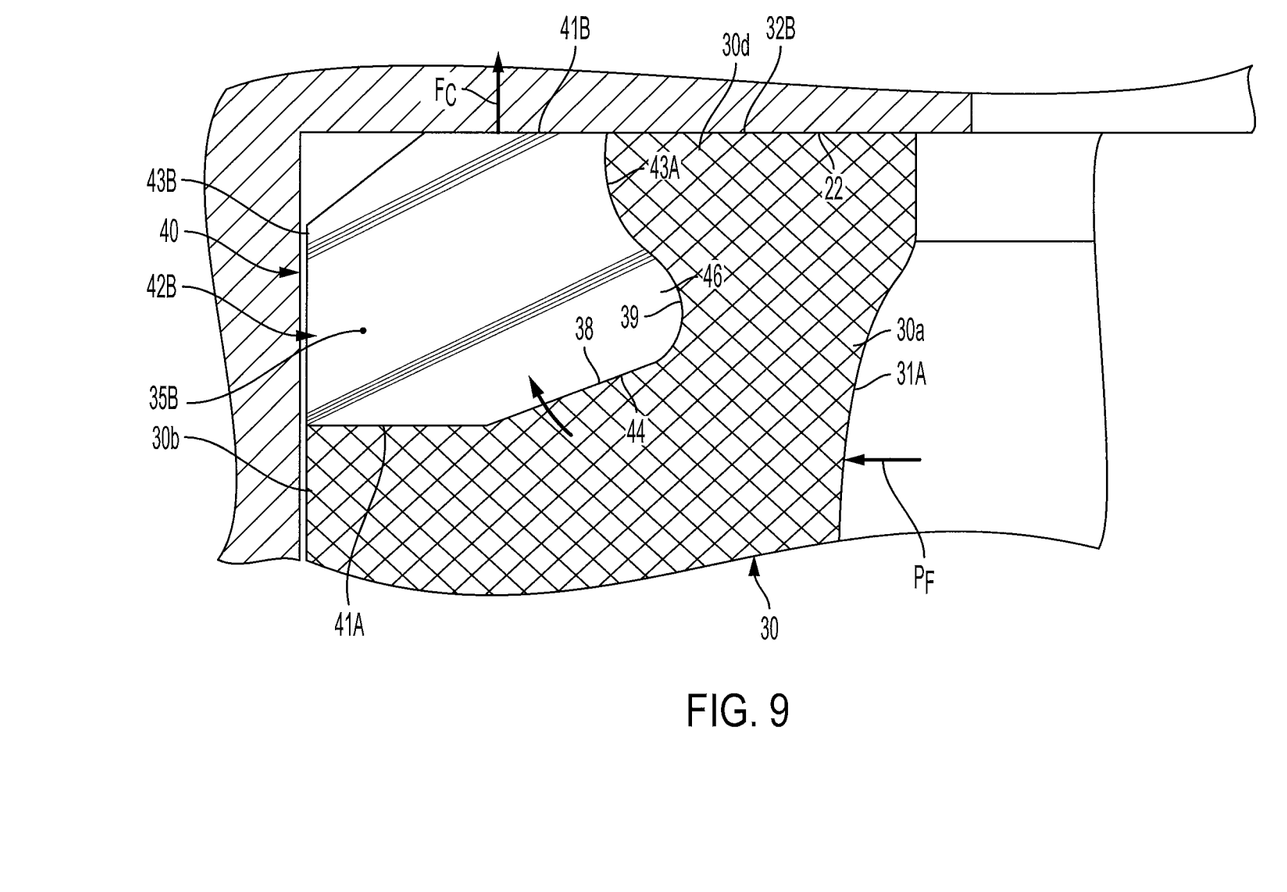
FIG. 9 is a more enlarged view of a portion of FIG. 8.
Figure 10:
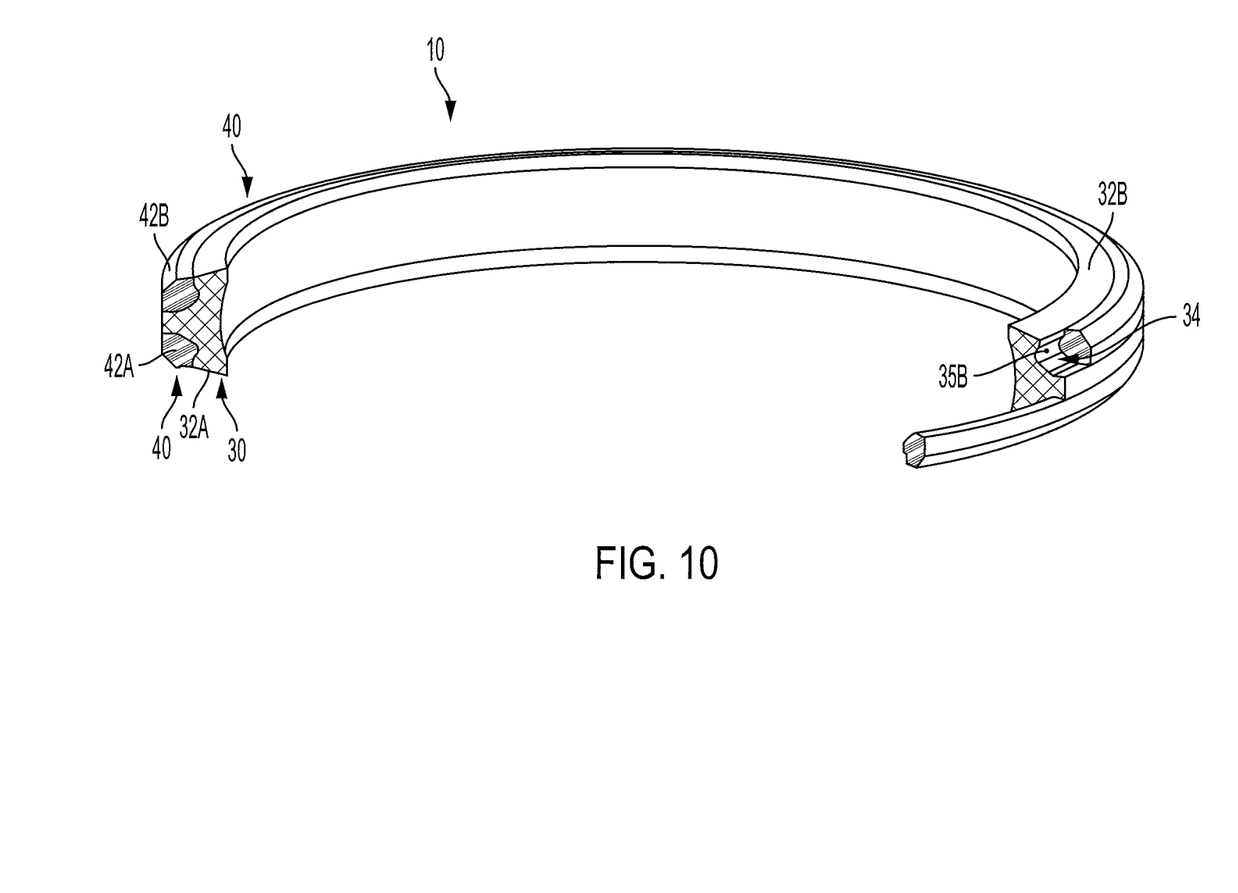
FIG. 10 is a broken-away, perspective view of the seal assembly of FIG. 7, shown in a "free" or uninstalled state.
Figure 11:
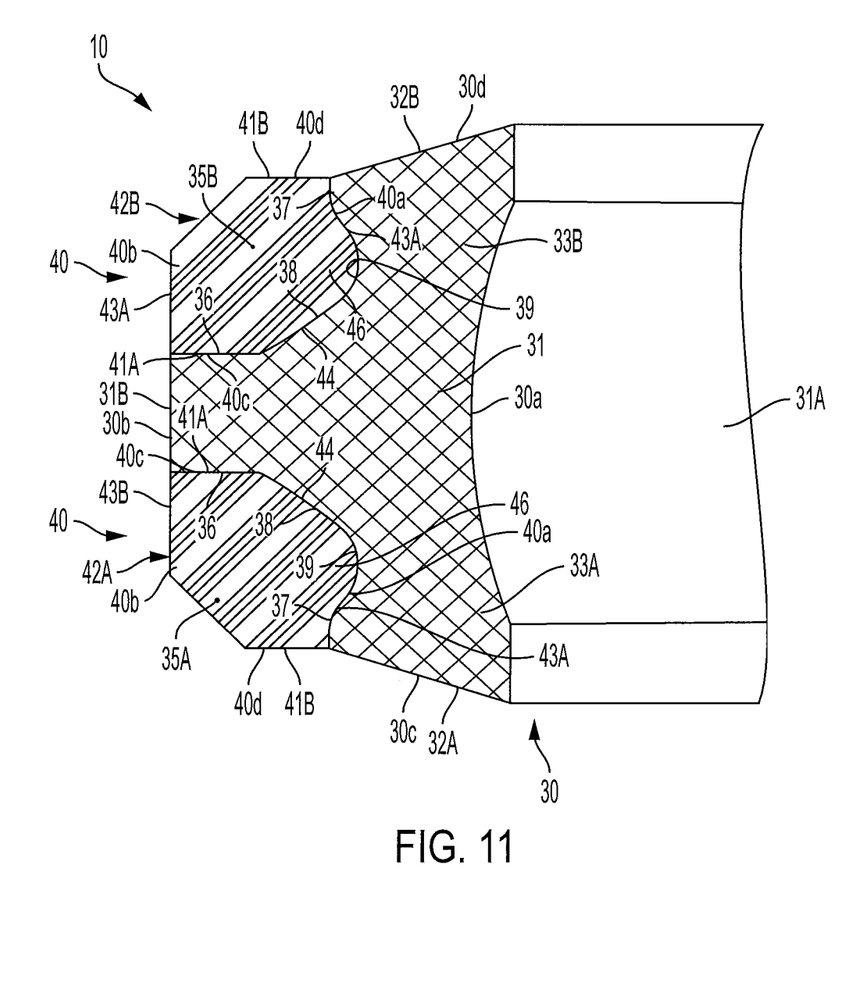
FIG. 11 is an enlarged, broken-away axial cross-sectional view of the alternative seal assembly.
Figure 12:
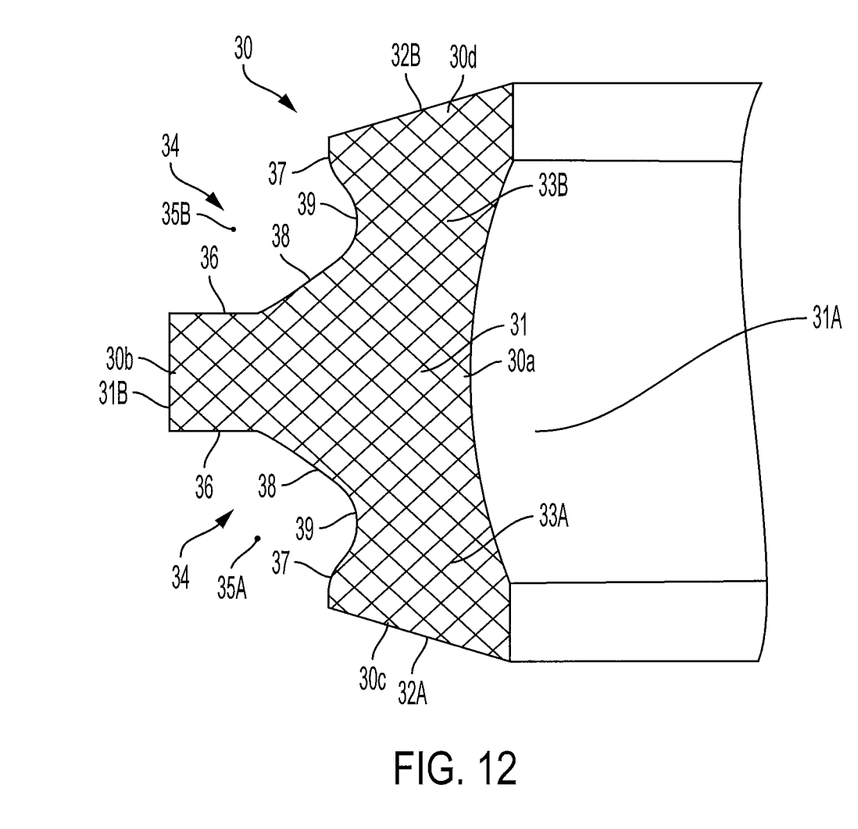
FIG. 12 is an enlarged, broken-away axial cross-sectional view of a seal body of the alternative seal assembly.

More specifically, fluid pressure $P_F$ exerted on the inner circumferential surface 31A of the seal body 30 tends to compress the seal body 30 generally radially outwardly. Such radial outward compression of the seal body 30 deflects or displaces the angled activation surface(s) 38 generally axially outwardly toward the facing tubular member end surface 18 or 22. Such deflection/displacement of the seal body activation surface(s) 38 pushes or biases the associated backing ring 40 axially toward the associated/adjacent tubular member end surface 18 or 22, as indicated in FIGS. 3 and 9. Thereby, the contact force Fc exerted by each backing ring 40, 42A or 42B against the associated end surface 18 or 22 is increased, which substantially reduces the potential for extrusion of seal material between the ring 40, or rings 42A, 42B, and the tubular members 12, 14.

Figure 1:
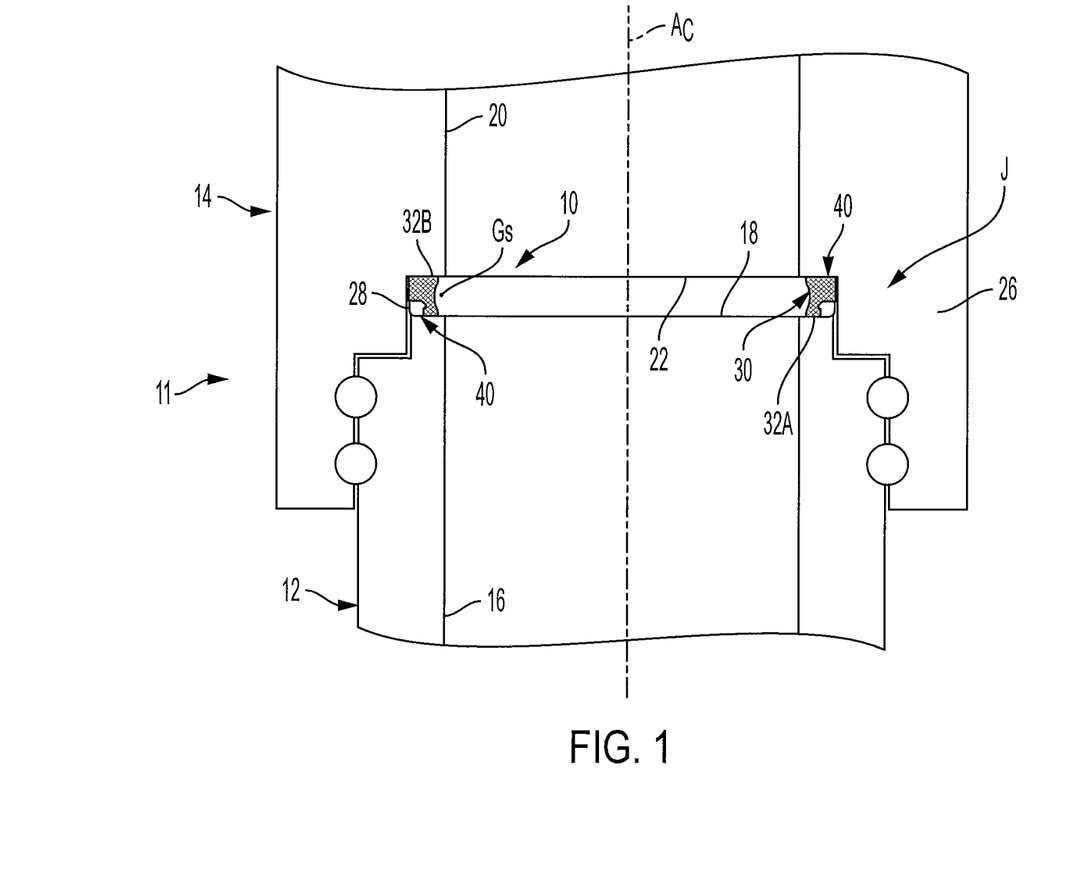
FIG. 1 is a broken-away, axial cross-sectional view of a mechanical assembly including a seal assembly in accordance with a preferred construction of the present invention.
Figure 2:
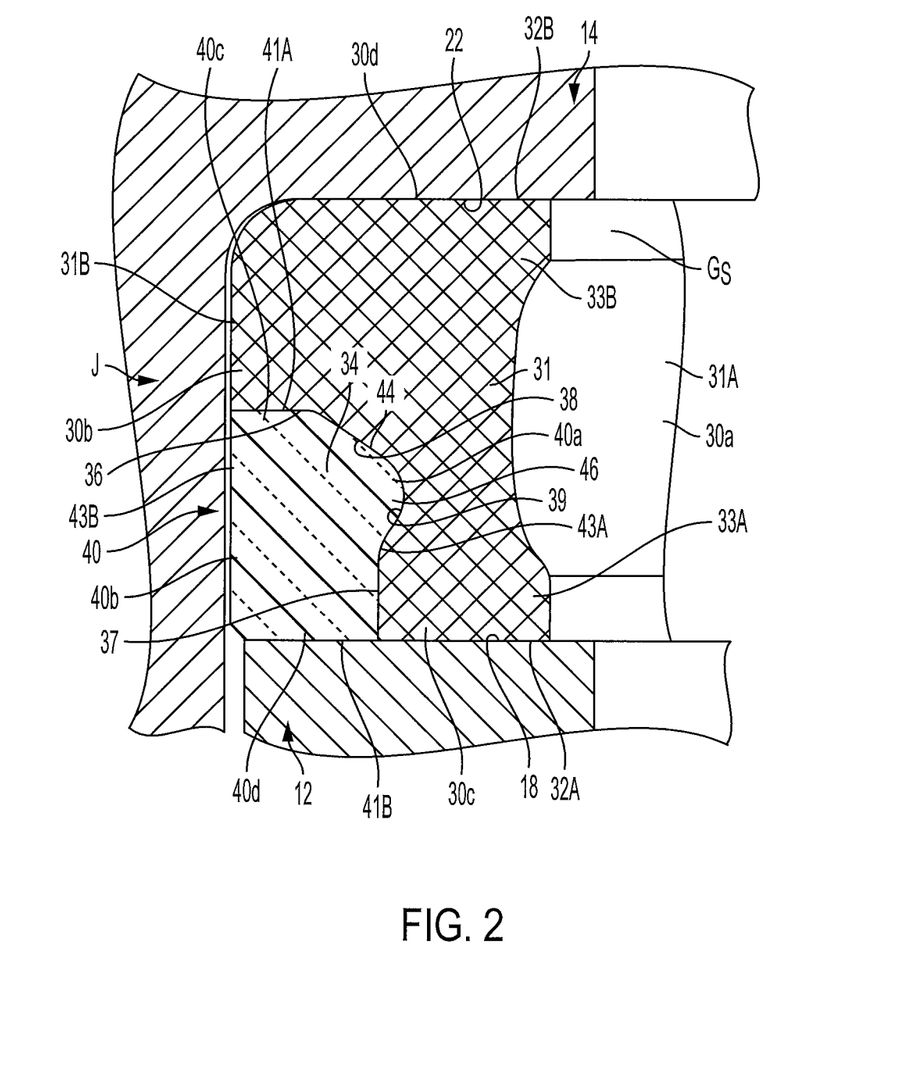
FIG. 2 is a greatly enlarged view of a portion of FIG. 1.
Figure 5:
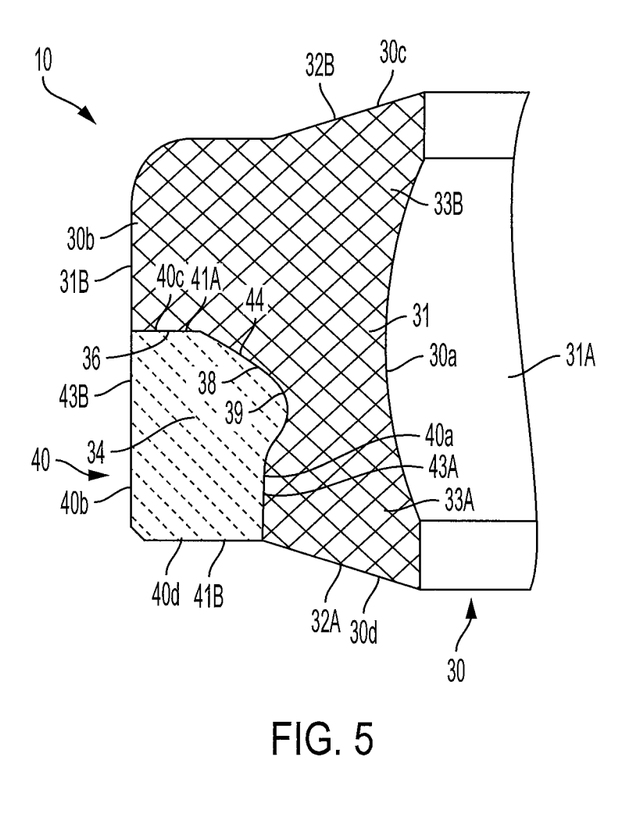
FIG. 5 is an enlarged, broken-away axial cross-sectional view of the seal assembly.
Figure 6:
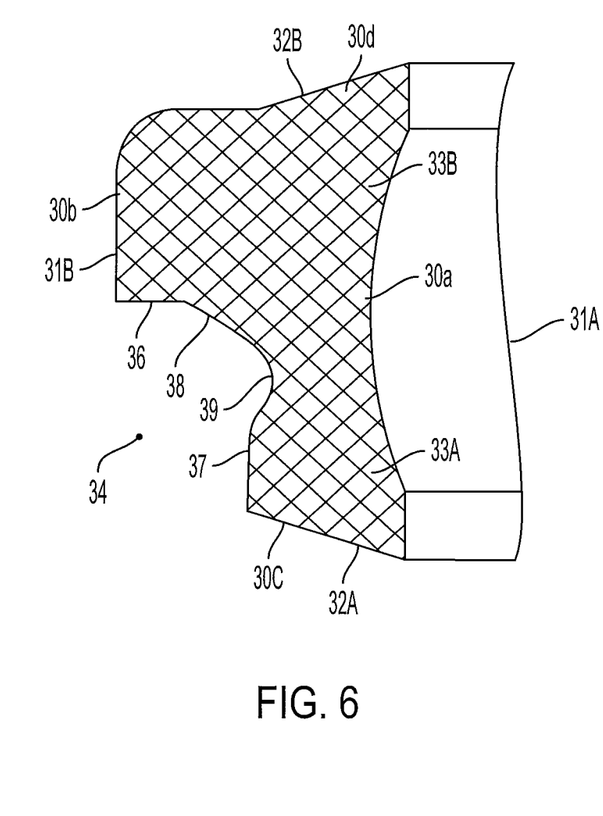
FIG. 6 is an enlarged, broken-away axial cross-sectional view of a seal body of the seal assembly.
Figure 7:
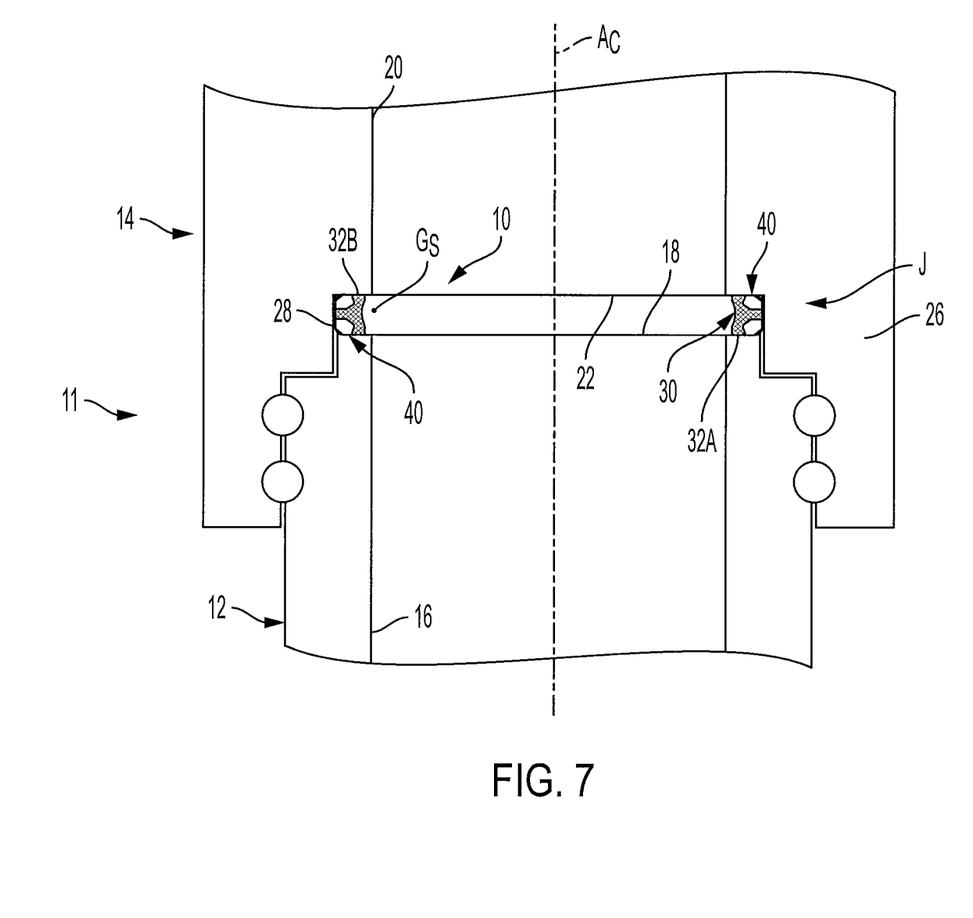
FIG. 7 is a broken-away, axial cross-sectional view of a mechanical assembly including a seal assembly in accordance with an alternative construction of the present invention.
Figure 8:
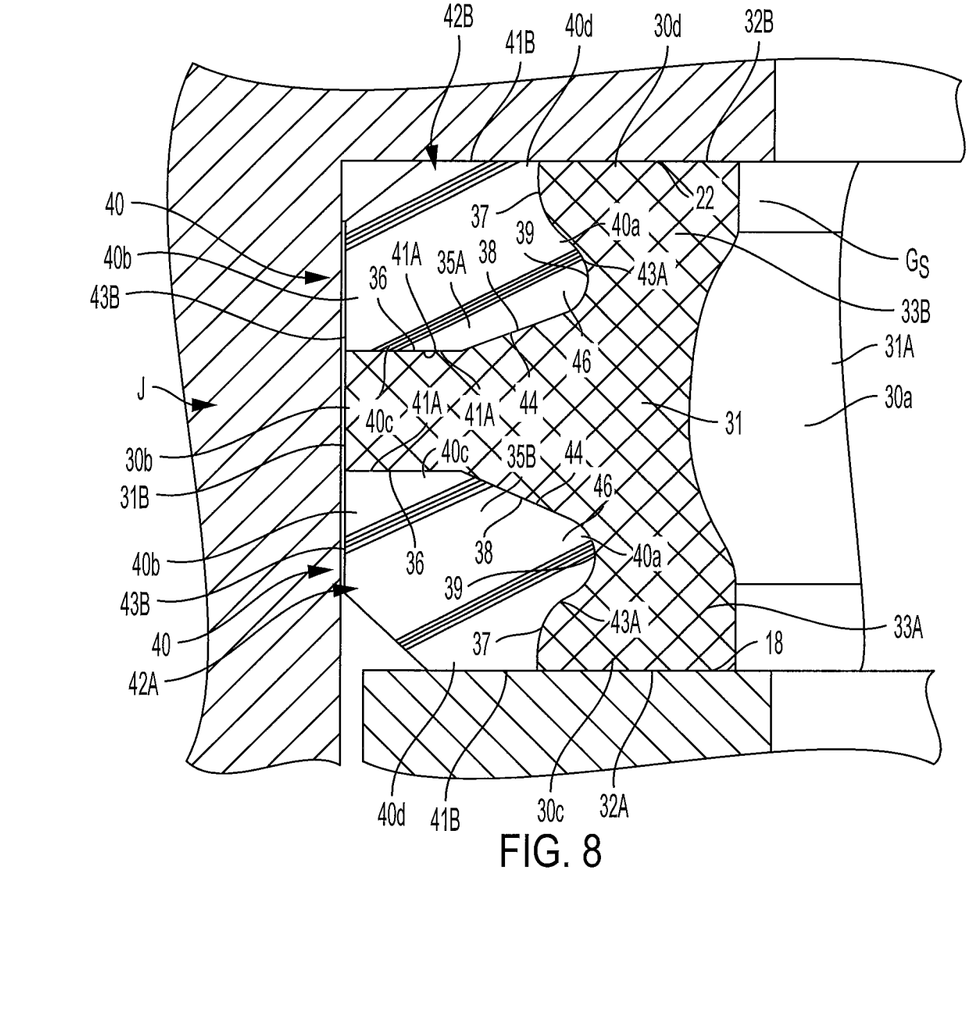
FIG. 8 is a greatly enlarged view of a portion of FIG. 7.

Referring now to FIGS. 2, 3 and 5, each backing ring 40 is preferably releasably coupled with the seal body 30 by friction, but may alternatively be permanently or semi-permanently coupled by adhesives, fasteners or any other appropriate means. Most preferably, the seal body 30 includes one or two sockets 39, each extending generally radially inwardly from the outer circumferential surface 37 of the recess 34 or of each one of the two recesses 35A, 35B. Each backing ring 40 preferably includes a generally annular projection 46 extending generally radially inwardly from the ring inner radial end 40a. Each backing ring projection 46 is disposeable within the socket 39 of the associated recess 34, 35A or 35B to thereby releasably couple the backing ring 40 with the seal body 30. Alternatively, the seal body 30 may include at least one and preferably two annular projections (not shown) extending radially outwardly from each outer circumferential surface 37 and each backing ring 40 may include an annular socket (not shown) extending generally radially outwardly from the ring inner end 40a, with the seal projections being disposeable within the backing ring sockets (structure not depicted).

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined herein and in the appended claims.

We claim:

1. A seal assembly for sealing between first and second tubular members, each tubular member having a central passage and a generally annular end surface surrounding the passage, the first member passage being fluidly coupled with the second member passage, the first member end surface facing and being spaced apart from the second member end surface along a central axis so as to define an annular gland, and the first member being angularly displaceable about the axis with respect to the second member, the seal assembly comprising:

a generally annular seal body disposeable within the annular gland and formed of a generally compressible polymeric material, the seal body having opposing inner and outer radial ends, a first axial end having a first axial sealing surface disposeable against the first member end surface, a second axial end having a second axial sealing surface disposeable against the second member end surface, and at least one recess defined by a generally radial surface extending radially inwardly from the seal body outer radial end, an outer circumferential surface extending axially inwardly from the first axial end and an angled activation surface extending generally axially and radially between the radial surface and the circumferential surface, the first sealing surface being located generally between the recess and the inner radial end; and a generally annular backing ring formed of a substantially rigid material and disposed at least partially within the at least one seal recess to couple the backing ring with the seal body, the backing ring having opposing inner and outer radial ends and inner and outer axial ends, the outer axial end being disposeable against the first member end surface such that the backing ring prevents radially outward displacement of the portions of the seal at the first member end surface, the backing ring being biased generally axially toward the first member end surface when compression of the seal body displaces the activation surface generally axially.

2. The seal assembly as recited in claim 1 wherein:

the seal body has one of an annular socket extending generally radially inwardly from the outer circumferential surface and an annular projection extending radially outwardly from the outer circumferential surface; and the backing ring includes one of an annular projection extending generally inwardly from ring inner radial end and disposeable within the seal socket to releasably couple the backing ring with the seal body and an annular socket extending generally radially outwardly from the ring inner end and the seal body projection is disposed within the backing recess to releasably couple the backing ring with the seal body.

3. The seal assembly as recited in claim 1 wherein:

the seal recess is a first recess defined by a first radial surface, a first circumferential surface and a first activation surface and the seal further includes a second recess defined by a second generally radial surface extending radially inwardly from the seal body outer radial end and spaced axially from the first radial surface, a second outer circumferential surface extending axially inwardly from the second axial end and an second angled activation surface extending generally axially and radially between the second radial surface and the second circumferential surface, the second sealing surface being located generally between the second recess and the seal inner radial end;

the backing ring is a first backing ring; and the seal assembly further comprises a second generally annular backing ring formed of a substantially rigid material and disposed at least partially within the second recess to couple the second backing ring with the seal, the second backing ring having opposing inner and outer radial ends and inner and outer axial ends, the outer axial end being disposeable against the second member end surface such that the second backing ring prevents radially outward displacement of portions of the seal at the second member end surface, the second backing ring being biased generally axially toward the second member end surface when compression of the seal displaces the second activation surface generally axially.

4. The seal assembly as recited in claim 3 wherein radially-outward compression of the seal body displaces each one of the first and second backing rings axially and away from the other one of the first and second backing rings.

5. The seal assembly as recited in claim 3 wherein the seal has a central outer circumferential surface at the seal outer radial end and extending axially between the first radial surface and the second radial surface.

6. The seal assembly as recited in claim 1 wherein the backing ring has a radial surface at the inner radial end, an inner circumferential surface and an angled engagement surface extending generally axially and radially between the radial surface and the circumferential surface and disposed generally against the seal body activation surface.

7. The seal assembly as recited in claim 1 wherein the seal body is formed of hydrogenated nitrile butadiene rubber (HNBR) or polyurethane plastic and the backing ring is formed of a metallic material or a rigid thermoplastic material.

8. A seal assembly for sealing between first and second tubular members, each tubular member having a central passage and a generally annular end surface surrounding the passage, the first member passage being fluidly coupled with the second member passage, the first member end surface facing and being spaced apart from the second member end surface along a central axis so as to define an annular gland, and the first member being angularly displaceable about the axis with respect to the second member, the seal assembly comprising:
a generally annular seal body disposeable within the annular gland and formed of a generally compressible polymeric material, the seal body having opposing inner and outer radial ends, a first axial end having a first sealing surface disposeable against the first member end surface, a second axial end having a second sealing surface disposeable against the second member end surface, at least one annular recess defined at least partially by a radial surface extending radially inwardly from the outer end and an outer circumferential surface extending axially inwardly from the first axial end, and one of an annular socket extending radially inwardly from the outer circumferential surface and an annular projection extending generally radially outwardly from the outer circumferential surface; and
a generally annular backing ring formed of a substantially rigid material and disposed at least partially within the at least one seal recess to couple the backing ring with the seal body, the backing ring having opposing inner and outer radial ends and inner and outer axial ends, the outer axial end being disposeable against the first member end surface such that the backing ring prevents radially outward displacement of the portions of the seal at the first member end surface, the backing ring including one of an annular projection extending generally radially inwardly from ring inner radial end and disposeable within the seal socket to releasably couple the backing ring with the seal body and an annular socket extending generally radially outwardly from the ring inner radial end and the seal body projection is disposed within the backing ring socket to releasably couple the backing ring with the seal body.

9. The seal assembly as recited in claim 8 wherein:
the seal body recess is partially defined by an angled activation surface extending generally axially and radially between the seal body radial surface and the seal body circumferential surface; and
the backing ring is disposed at least partially against the activation surface such that the backing ring is biased generally axially toward the first member end surface when compression of the seal body displaces the activation surface generally axially.

10. A seal assembly for sealing between first and second tubular members, each tubular member having a central passage and a generally annular end surface surrounding the passage, the first member passage being fluidly coupled with the second member passage, the first member end surface facing and being spaced apart from the second member end surface along a central axis so as to define an annular gland, and the first member being angularly displaceable about the axis with respect to the second member, the seal assembly comprising:
a generally annular seal body disposeable within the annular gland and formed of a generally compressible polymeric material, the seal body having opposing inner and outer radial ends, a first axial end having a first axial sealing surface disposeable against the first member end surface, a second axial end having a second axial sealing surface disposeable against the second member end surface, and at least one recess defined by a generally radial surface extending radially inwardly from the seal body outer radial end, an outer circumferential surface extending axially inwardly from the first axial end and an angled activation surface extending generally axially and radially between the radial surface and the circumferential surface, the first sealing surface being located generally between the recess and the inner radial end; and
a generally annular backing ring formed of a substantially rigid material and disposed at least partially within the at least one seal recess to couple the backing ring with the seal body, the backing ring having opposing inner and outer radial ends and inner and outer axial ends, the outer axial end being disposeable against the first member end surface such that the backing ring prevents radially outward displacement of the portions of the seal at the first member end surface, the backing ring being biased generally axially toward the first member end surface when compression of the seal body displaces the activation surface generally axially;
wherein the seal recess is a first recess defined by a first radial surface, a first circumferential surface and a first activation surface and the seal further includes a second recess defined by a second generally radial surface extending radially inwardly from the seal body outer radial end and spaced axially from the first radial surface, a second outer circumferential surface extending axially inwardly from the second axial end and an second angled activation surface extending generally axially and radially between the second radial surface and the second circumferential surface, the second sealing surface being located generally between the second recess and the seal inner radial end;
wherein the backing ring is a first backing ring; and
wherein the seal assembly further comprises a second generally annular backing ring formed of a substantially rigid material and disposed at least partially within the second recess to couple the second hacking ring with the seal, the second hacking ring having opposing inner and outer radial ends and inner and outer axial ends, the outer axial end being disposeable against the second member end surface such that the second backing ring prevents radially outward displacement of portions of the seal at the second member end surface, the second backing ring being biased generally axially toward the second member end surface when compression of the seal displaces the second activation surface generally axially.

* * * * *